US012572562B1

(12) United States Patent
Khan et al.

(10) Patent No.: US 12,572,562 B1
(45) Date of Patent: Mar. 10, 2026

(54) SYSTEMS AND METHODS FOR BATCH PROCESSING OF BLOCKCHAIN OPERATIONS

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Sammy Alnajar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/882,705

(22) Filed: Sep. 11, 2024

(51) Int. Cl.
| | |
|---|---|
| *G06F 16/00* | (2019.01) |
| *G06F 16/27* | (2019.01) |
| *H04L 9/00* | (2022.01) |
| *G06F 21/62* | (2013.01) |

(52) U.S. Cl.
CPC .............. *G06F 16/275* (2019.01); *H04L 9/50* (2022.05); *G06F 21/6218* (2013.01)

(58) Field of Classification Search
None
See application file for complete search history.

(56) References Cited

U.S. PATENT DOCUMENTS

| | | | |
|---|---|---|---|
| 10,867,288 B1* | 12/2020 | Mokshagundam | .... G06Q 20/02 |
| 2017/0017936 A1* | 1/2017 | Bisikalo | ............... G06Q 20/308 |
| 2020/0334379 A1* | 10/2020 | DeRosa-Grund | ..... G06F 21/645 |
| 2020/0349283 A1* | 11/2020 | Saket | ................... G06F 21/6254 |
| 2021/0241241 A1* | 8/2021 | Lokanath | ............. G06Q 20/065 |
| 2021/0349854 A1* | 11/2021 | Sun | ........................ H04L 9/3247 |
| 2022/0100731 A1* | 3/2022 | Tirapu Azpiroz | ..... G01N 33/02 |
| 2022/0405747 A1* | 12/2022 | Coughlan | ............. H04L 9/3239 |
| 2023/0062434 A1* | 3/2023 | Wagner | ................ G06Q 20/405 |
| 2023/0088674 A1* | 3/2023 | Lee | ........................ H04L 67/566 |
| | | | 705/75 |
| 2023/0353393 A1* | 11/2023 | Feng | ...................... H04L 9/0891 |
| 2024/0176647 A1* | 5/2024 | Krishnan | .................. H04L 9/50 |
| 2025/0094385 A1* | 3/2025 | Choudhury | ............. G06F 16/13 |

* cited by examiner

*Primary Examiner* — Hasanul Mobin

(57) ABSTRACT

A system described herein may maintain a blockchain in conjunction with a plurality of other devices. The system may receive a first request to perform a first set of operations with respect to the blockchain, and may process the first request. Processing the first request may include performing the first set of operations to generate a first result set. Prior to completing processing of the first request, the system may receive a second request to perform a second set of operations with respect to the blockchain, and a third request to perform a third set of operations with respect to the blockchain. After completing processing of the first request, the system may batch process the second and third requests. Batch processing the second and third requests may include performing the second set of operations and the third set of operations to generate a second result set.

18 Claims, 10 Drawing Sheets

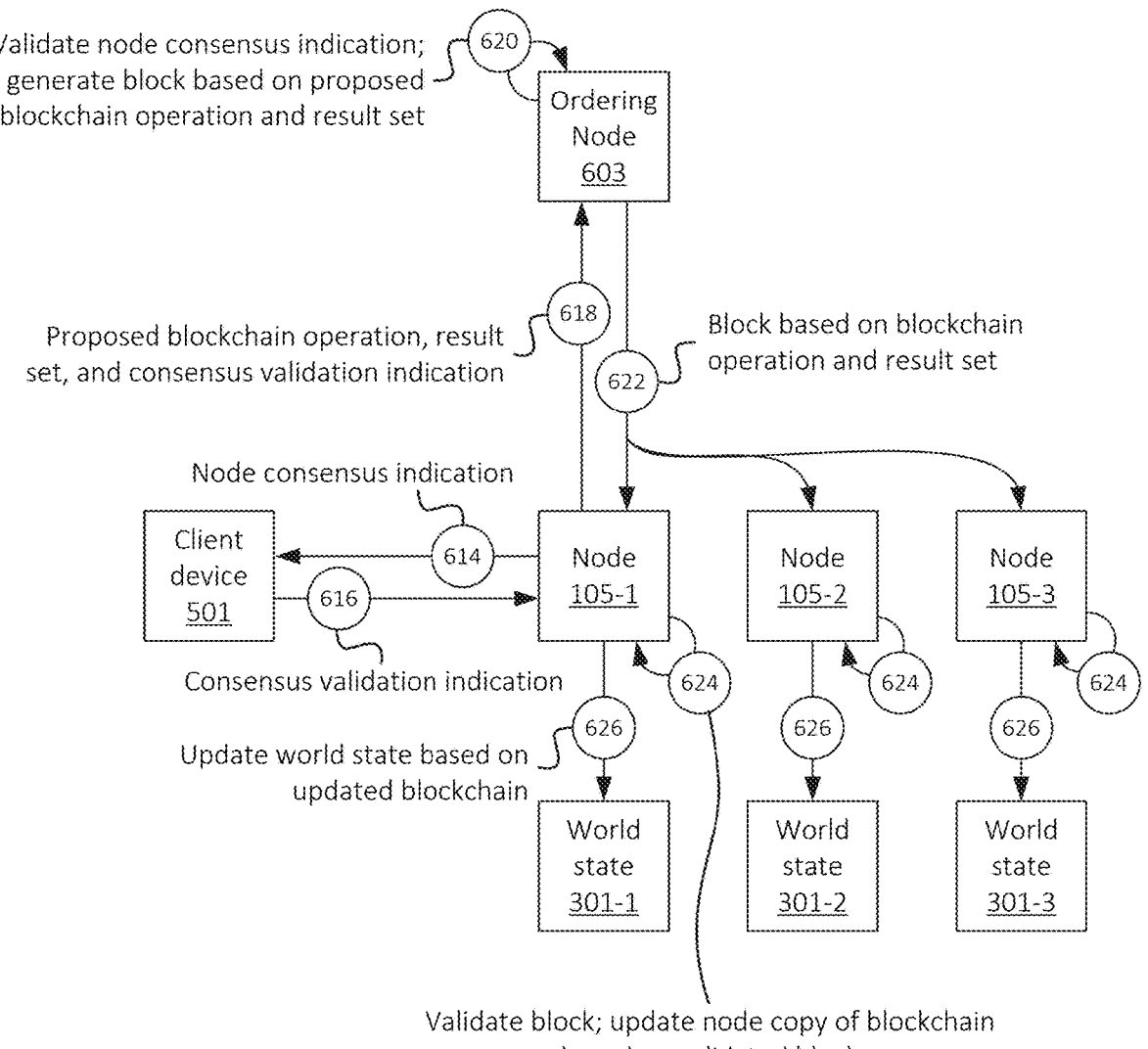

Validate node consensus indication; generate block based on proposed blockchain operation and result set Ordering Node 603

Proposed blockchain operation, result set, and consensus validation indication

Block based on blockchain operation and result set

Node consensus indication

Client device 501

Node 105-1

Node 105-2

Node 105-3

Consensus validation indication

Update world state based on updated blockchain

World state 301-1

World state 301-2

World state 301-3

Validate block; update node copy of blockchain based on validated block

FIG. 6

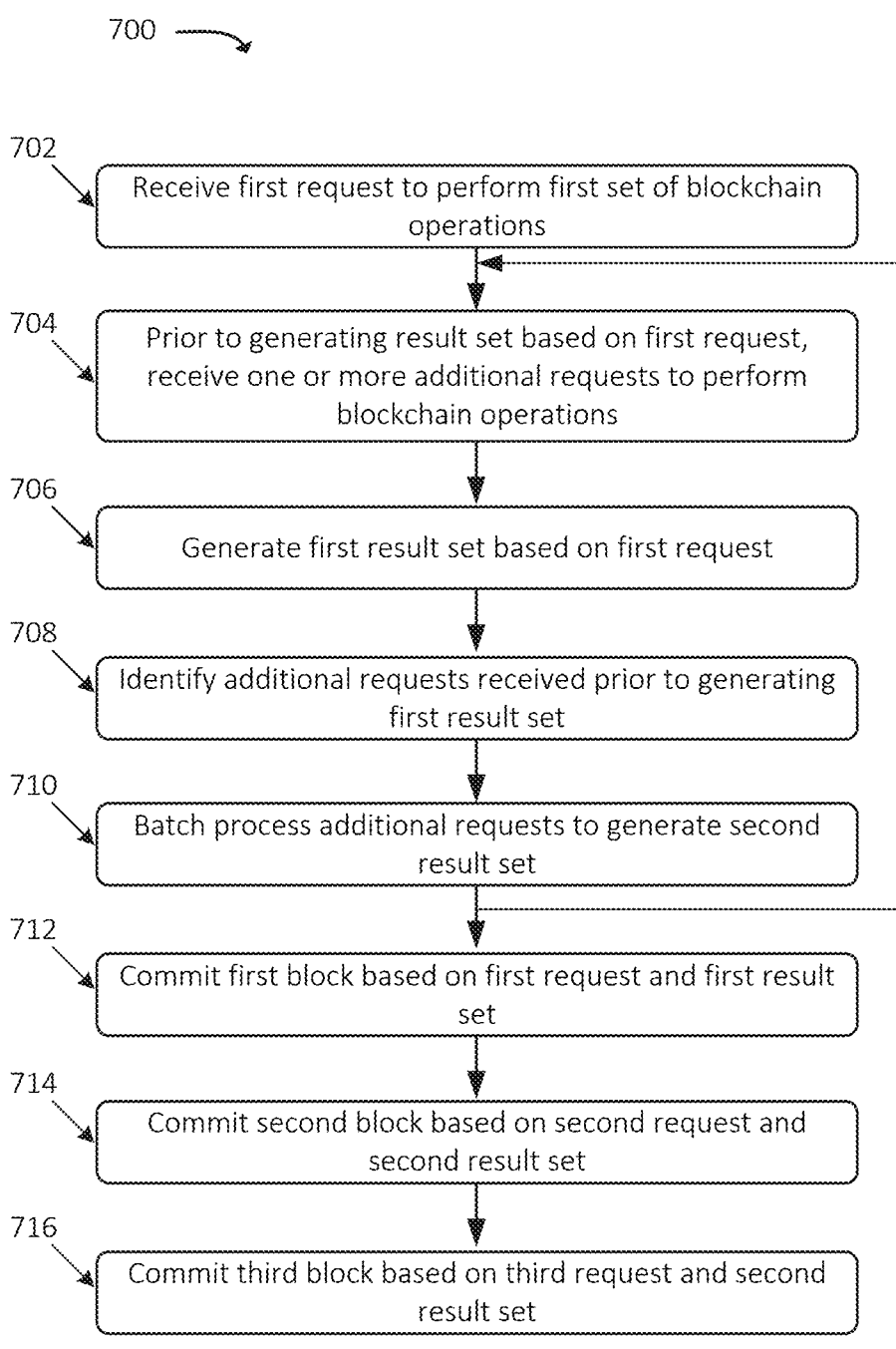

700

702 — Receive first request to perform first set of blockchain operations

704 — Prior to generating result set based on first request, receive one or more additional requests to perform blockchain operations 706 — Generate first result set based on first request 708 — Identify additional requests received prior to generating first result set 710 — Batch process additional requests to generate second result set 712 — Commit first block based on first request and first result set 714 — Commit second block based on second request and second result set 716 — Commit third block based on third request and second result set

802
Monitor blockchain for QoS adjustment requests

804
Identify record with multiple QoS adjustment requests

806
Implement multiple network configuration adjustments based on multiple QoS adjustment requests included in identified record

SYSTEMS AND METHODS FOR BATCH PROCESSING OF BLOCKCHAIN OPERATIONS

BACKGROUND

Blockchains provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

BRIEF DESCRIPTION OF THE DRAWINGS

FIGS. 5 and 6 illustrate example operations associated with recording information to a blockchain, in accordance with some embodiments;

FIG. 7 illustrates an example process for batch processing requests to perform blockchain operations, in accordance with some embodiments;

DETAILED DESCRIPTION OF EXAMPLE EMBODIMENTS

The following detailed description refers to the accompanying drawings. The same reference numbers in different drawings may identify the same or similar elements.

Organizations often provide network management services to multiple enterprise customers. Often, each of these customers desires a secure and isolated environment to manage their own network configurations, monitor network performance, and implement many other functionalities. Some of these configuration and performance monitoring and modification operations may occur through the use of blockchain technology. Furthermore, in today's networking environment, managing bandwidth dynamically and in an efficient manner is a key factor to ensuring optimal network performance and Quality of Service ("QoS"). In this dynamic environment, network operators often need to adjust bandwidth allocation in real-time to address the traffic loads and priority levels of applications and users. In this context, concurrent requests to adjust the same network segment bandwidth can lead to conflicts and inconsistencies if not properly and efficiently handled.

In some instances, network operators may operate large scale networks for use by their customers, where each customer has various applications (e.g., video conferencing, file transfer, Internet of Things ("IoT") devices, streaming, and the like) that dynamically demand different bandwidth levels). A network operator may receive simultaneous requests to adjust the bandwidth allocation for the same network, where presently only the first request will be addressed, while other requests are rejected.

Figure 1:
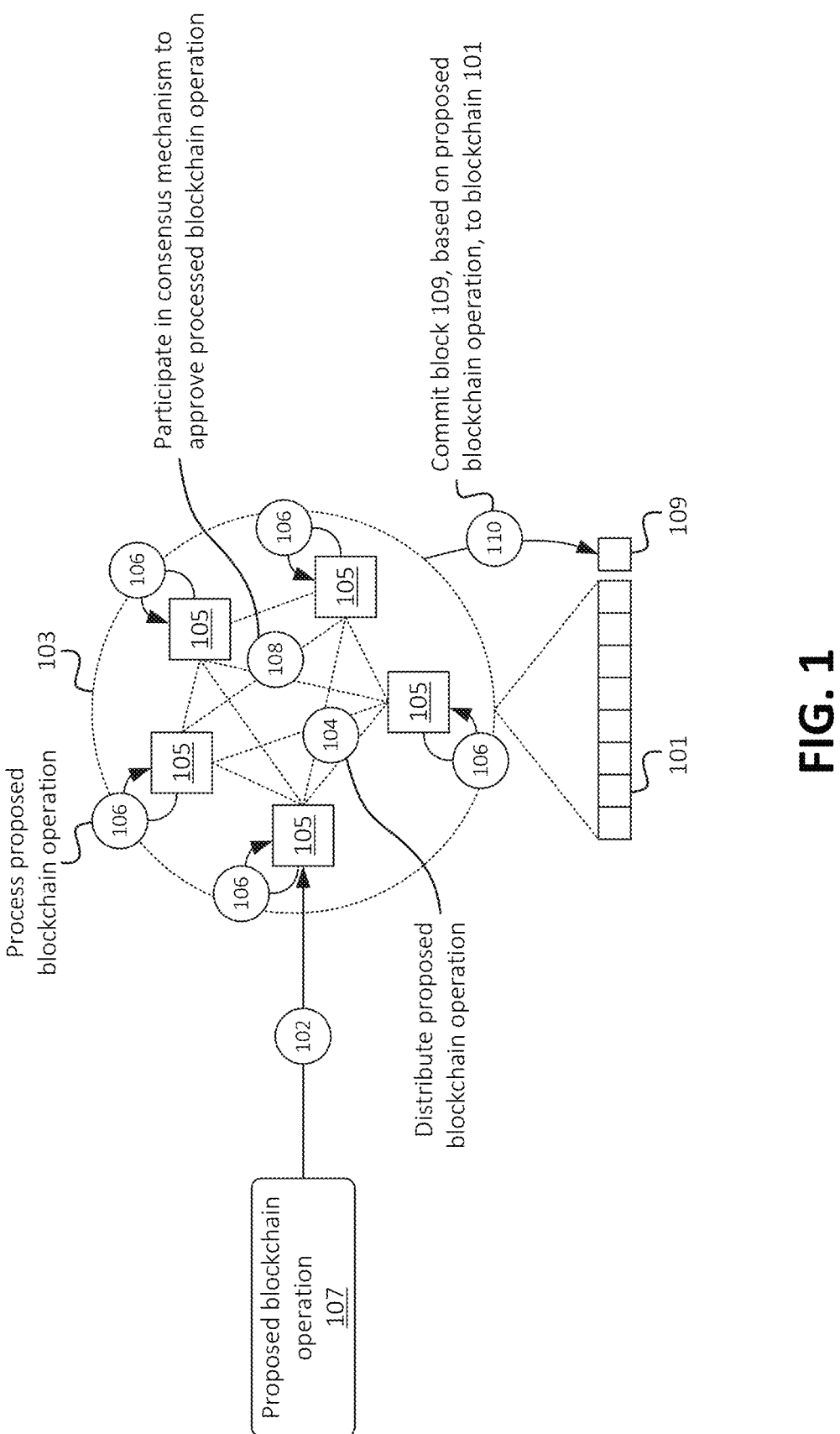
FIGS. 1 and 2 illustrate an example consensus mechanism used by a blockchain network to commit blocks to a blockchain.

Using blockchains to implement such operations may provide significant advantages due to the nature of blockchain technology. For example, as shown in FIG. 1, a blockchain 101 may be maintained by a particular blockchain network 103, which includes multiple nodes 105. Nodes 105 may include devices or systems such as geographically distributed or otherwise distinct servers, workstations, etc., that communicate with each other to maintain local copies of blockchain 101. For example, nodes 105 may maintain local copies of blockchain 101, and changes to blockchain 101 (e.g., adding blocks) may be subject to satisfying a consensus mechanism implemented by blockchain network 103. The consensus mechanism may aid in avoiding unauthorized changes from being made to the blockchain, thus providing a measure of immutability to the blockchain.

As shown in FIG. 1, the consensus mechanism may be used to securely perform a proposed blockchain operation 107. For example, proposed blockchain operation 107 may be received (at 102) by a particular node 105 of blockchain network 103. Proposed blockchain operation 107 may specify a set of inputs (e.g., variables, values, references to blocks previously recorded to blockchain 101, etc.) and/or a set of operations to perform on the inputs. In some instances, the set of operations may include or may be specified by chaincode, which may be implemented by application programming interfaces ("APIs"), software development kits ("SDKs"), applications, etc. implemented by nodes 105 (e.g., "off-chain" chaincode) and/or which may be specified in information recorded to one or more blocks of blockchain 101 (e.g., "on-chain" chaincode).

Proposed blockchain operation 107 may be distributed (at 104) to some or all of the other nodes 105 of blockchain network 103. In some implementations, the distribution (at 104) of proposed blockchain operation 107 among nodes 105 may be implemented by a "gossip" protocol or other suitable distribution mechanism. Each node 105 may independently process (at 106) proposed blockchain operation 107. For example, nodes 105 may each perform the set of operations specified by proposed blockchain operation 107 on a set of inputs specified by proposed blockchain operation 107. Performing the set of operations, by each node 105, may include generating a result set (also sometimes referred to as a "read-write set") that includes, for example, one or more outputs that result from performing the set of operations specified by proposed blockchain operation 107.

Nodes 105 may participate (at 108) in a consensus mechanism, based on which nodes 105 may determine whether to approve or validate proposed blockchain operation 107. For example, result sets generated by different respective nodes 105 may be evaluated and compared by some or all of the other nodes 105 of blockchain network 103 in order to determine whether the same result set has been generated by at least a threshold quantity of nodes 105, in accordance with a consensus policy implemented by blockchain network 103. For example, one consensus policy may require unanimous approval from all nodes 105, another consensus policy may require unanimous approval from a majority of nodes 105, yet another consensus policy may require unanimous approval from at least 75% of all nodes 105, and so on.

In this example, assume that the results generated by some or all nodes 105 satisfies the consensus policy. A new block 109, that is based on proposed blockchain operation 107 (e.g., which includes the result of performing proposed blockchain operation 107 and/or other suitable information), may be "committed," or recorded (at 110) to blockchain 101. For example, committing block 109 may include each node 105 updating its local copy of blockchain 101 to further include new block 109.

Figure 2:
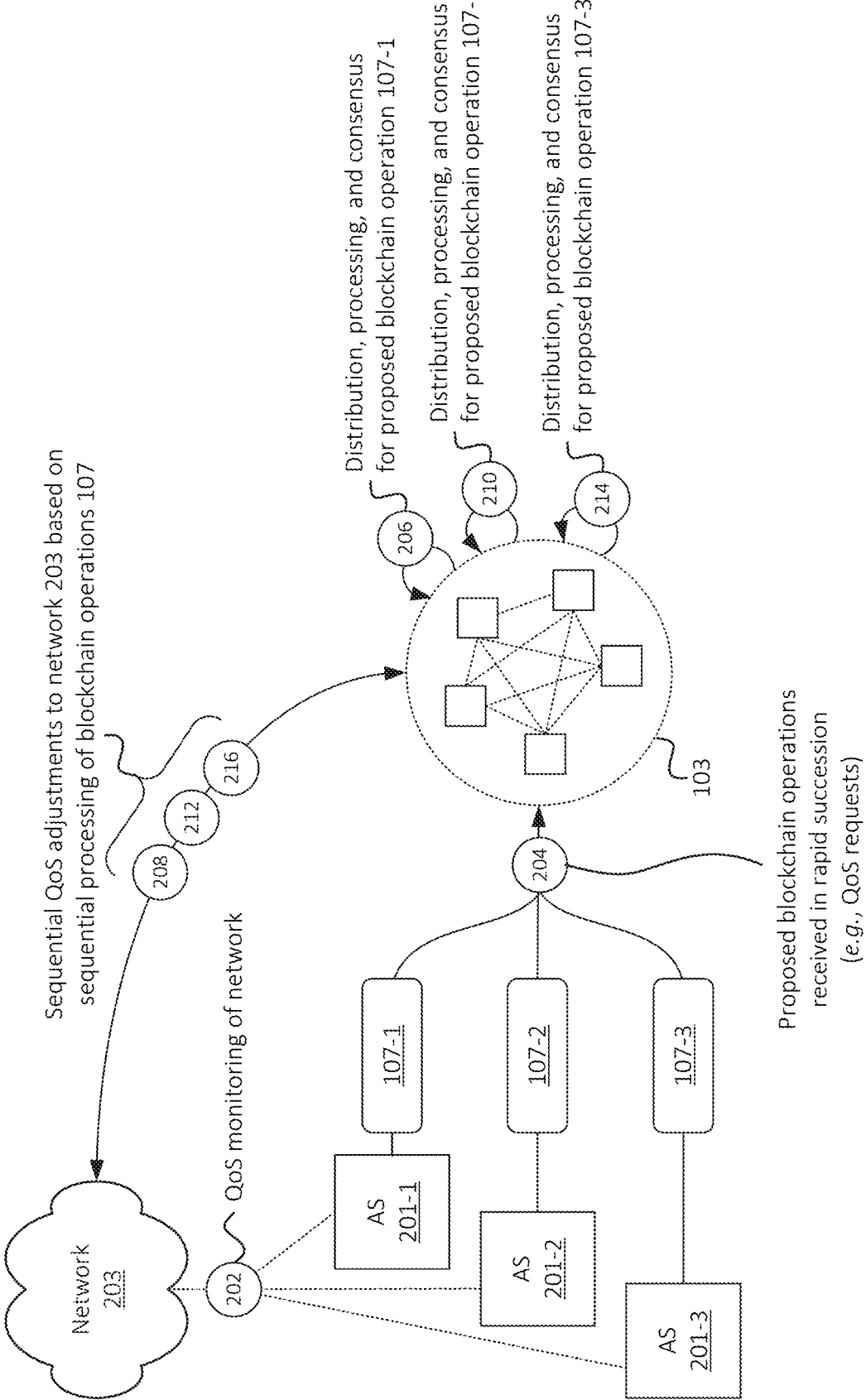

As shown in FIG. 2, multiple devices or systems, such as application servers 201 (e.g., application servers 201-1, 201-2, and 201-3) that communicate via a particular network 203, may perform (at 202) QoS monitoring of traffic sent or received via network 203. For example, application servers 201 may each monitor QoS metrics such as throughput, latency, jitter, and/or other types of QoS metrics. Application servers 201 may identify situations in which QoS adjustment requests should be made to network 203. For example, a given application server 201 may determine, based on the monitoring, that a measure of throughput provided via network 203 is below a threshold measure of throughput (e.g., a threshold associated with a Service Level Agreement ("SLA") established between such application server 201 and network 203). As another example, application server 201 may determine that a measure of latency provided via network is higher than a threshold measure of latency. Situations may arise in which numerous application servers 201 (e.g., application servers 201-1, 201-2, and 201-3) identify a demand for QoS adjustments in a relatively short period of time (e.g., within the same minute, within the same second, etc.).

In some embodiments, network 203 may be communicatively coupled to one or more nodes of blockchain network 103, and/or may otherwise have access recorded to blockchain 101 which is maintained by blockchain network 103. In some embodiments, network 203 may monitor blockchain 101 for QoS adjustment requests, and may perform configuration adjustments to network 203 in order to meet such QoS adjustment requests (e.g., requests from one or more particular application servers 201 for additional throughput, lower latency, etc.). Additionally, application servers 201 may be configured and/or authorized to issue proposed blockchain operations 107, which may be used to indicate QoS adjustment requests for network 203.

In the example of FIG. 2, multiple such proposed blockchain operations 107 (e.g., proposed blockchain operations 107-1, 107-2, and 107-3) may be received (at 204) from multiple sources (e.g., multiple application servers 201-1, 201-2, and 201-3), potentially in rapid succession. FIG. 2 illustrates an example in which the proposed blockchain operations 107 are be performed sequentially. For example, proposed blockchain operation 107-1 may be first be handled (at 206) by blockchain network 103, which may include the distribution of, processing of, and consensus for proposed blockchain operation 107-1. Network 203 (e.g., a network management system, a network configuration system, etc.) may monitor blockchain 101 and may identify (at 208) that blockchain operation 107-1 has been handled by blockchain network 103 (e.g., that blockchain 101 includes a record reflecting blockchain operation 107-1, such as a record with a QoS adjustment request from application server 201-1). Based on identifying the request from application server 201-1 (e.g., based on identifying the processing of blockchain operation 107-1), network 203 may make adjustments based on the request from application server 201-1.

Subsequently, proposed blockchain operation 107-2 may be handled (at 210) by blockchain network 103. Network 203 may identify (at 212) the processing of blockchain operation 107-2 (e.g., may identify a QoS adjustment request from application server 201-2), and may make configuration adjustments based on the QoS adjustment request from application server 201-2). Further subsequently, proposed blockchain operation 107-3 may be handled (at 214) by blockchain network 103. Network 203 may identify (at 216) the processing of blockchain operation 107-3 (e.g., may identify a QoS adjustment request from application server 201-3), and may make configuration adjustments based on the QoS adjustment request from application server 201-3).

The sequential handling of these multiple proposed blockchain operations 107 may introduce perceptible delay or "lag" in between the issuing (at 204) of some or all of proposed blockchain operations 107-1, 107-2, and/or 107-3 relative to the recording of respective blocks, generated based on proposed blockchain operations 107-1, 107-2, and/or 107-3, to blockchain 101. For example, although proposed blockchain operations 107-1, 107-2, and 107-3 may be received within one or two seconds of each other, the time taken to sequentially handle these proposed blockchain operations 107 may be an order of magnitude higher (e.g., each proposed blockchain operation 107 may take one minute or several minutes to perform), where this effect is magnified by receiving more and more proposed blockchain operations 107 within a relatively short timeframe.

Figure 3:
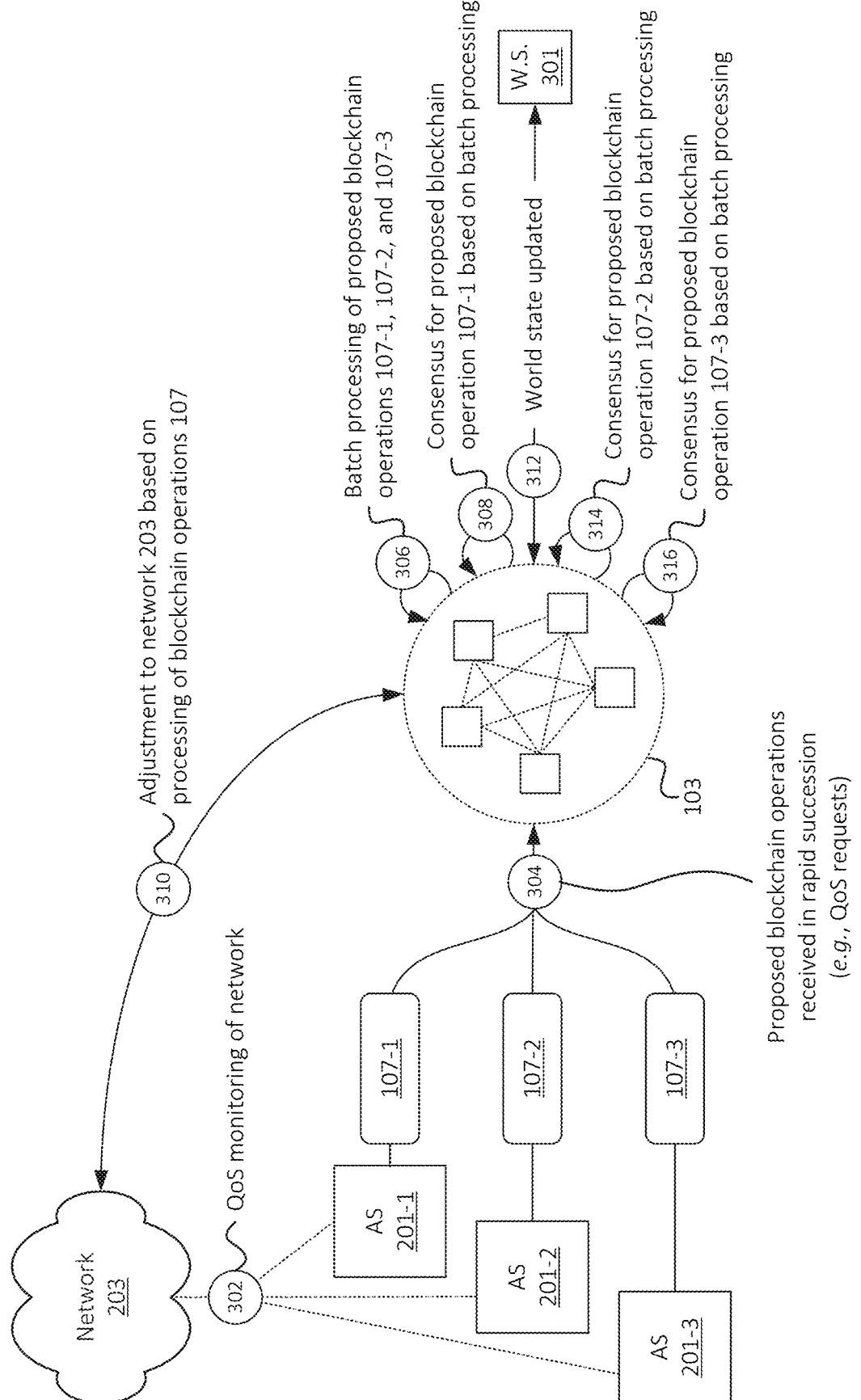
FIG. 3 illustrates an example overview of some embodiments described herein, in which multiple requests to perform blockchain operations are batch processed.

FIG. 3 illustrates an example overview of some embodiments described herein, in which multiple transactions may be batch processed in order to update blockchain 101 faster and with less delay than sequential processing techniques. As shown, and as similarly discussed above, multiple application servers 201 may monitor (at 302) QOS metrics associated with communications with network 203, and may output (at 304) proposed blockchain operations 107-1, 107-2, and 107-3 to blockchain network 103, potentially within a relatively short timeframe. As discussed above, such blockchain operations 107 may include QoS adjustment requests or other suitable types of messages. In accordance with some embodiments, and as discussed further below, blockchain network 103 may perform (at 306) a batch processing of some or all of proposed blockchain operations 107-1, 107-2, and/or 107-3. For example, nodes 105 may perform operations specified in all of proposed blockchain operations 107-1, 107-2, and/or 107-3 and may generate a result set that reflects a result of performing all three sets of operations. Further in accordance with some embodiments, nodes 105 of blockchain network 103 may participate (at 308) in a consensus mechanism to record a block to blockchain 101, where such block reflects the result of performing all three sets of operations (e.g., as specified by proposed blockchain operations 107-1, 107-2, and 107-3).

In this example, assume the consensus mechanism is successful, and that the new block is recorded. In some embodiments, this new block may include an identifier of blockchain 101 and/or some other suitable metadata or indicator associated with proposed blockchain operation 107-1, and may also include the result set of performing proposed blockchain operations 107-1, 107-2, and 107-3. Once the block has been recorded to blockchain 101 (e.g., based on the consensus for proposed blockchain operation 107-1), network 203 may identify (at 310) all three requests from application servers 201-1, 201-2, and 201-3, and may make one or more configuration adjustments in order to satisfy all three requests, without waiting for blockchain network 103 to perform consensus mechanisms with respect to blockchain operations 107-2 and 107-3.

Additionally, in some embodiments, world state information 301, associated with blockchain 101, may be updated (at 312) based on the result of performing all three of proposed blockchain operations 107-1, 107-2, and 107-3. World state information 301 may, for example, include or represent keys, variables, objects, assets, etc., as well as respective values for such information.

In one example, multiple blocks of blockchain 101 may include performance monitoring information for a wireless network. These multiple blocks may, for example, include a particular identifier denoting that the blocks include particular performance monitoring information for the wireless network, such as latency Key Performance Indicators ("KPIs"), throughput KPIs, Signal-to-Interference-and-Noise-Ratio ("SINR") KPIs, or the like on a rolling time window basis (e.g., updated every hour, every day, or the like). World state information 301 may include the latest values for a given KPI (e.g., based on the last recorded block that includes an identifier of the particular KPI), an averaging of values from multiple previous blocks, and/or other suitable information that is derived from blockchain 101.

In the example of FIG. 3, updating (at 312) world state information 301 after proposed blockchain operation 107-1 has been committed to blockchain 101 may result in a faster updating of world state information 301 than implementations in which proposed blockchain operations 107-1, 107-2, and 107-3 are handled serially (e.g., as shown in FIG. 2). For example, in the example of FIG. 2, the world state of blockchain 101 would only reflect the result of all three proposed blockchain operations 107 after the handling (at 214) of proposed blockchain operation 107-3 (e.g., which includes the separate processing of each proposed blockchain operation 107 by each node 105). On the other hand, in the example of FIG. 3, the batch processing (at 306) of proposed blockchain operations 107 may be faster and less resource-intensive than individually processing each proposed blockchain operation 107. Additionally, the updating of world state information 301, prior to the consensus and committing (at 314 and 316) of proposed blockchain operations 107-2 and 107-3, may result in a faster update to world state information 301 as compared to implementations in which the ultimate result of performing proposed blockchain operation 107-3 is incorporated in world state information 301 only after proposed blockchain operations 107-1, 107-2, and 107-3 have all been committed to blockchain 101.

Figure 4:
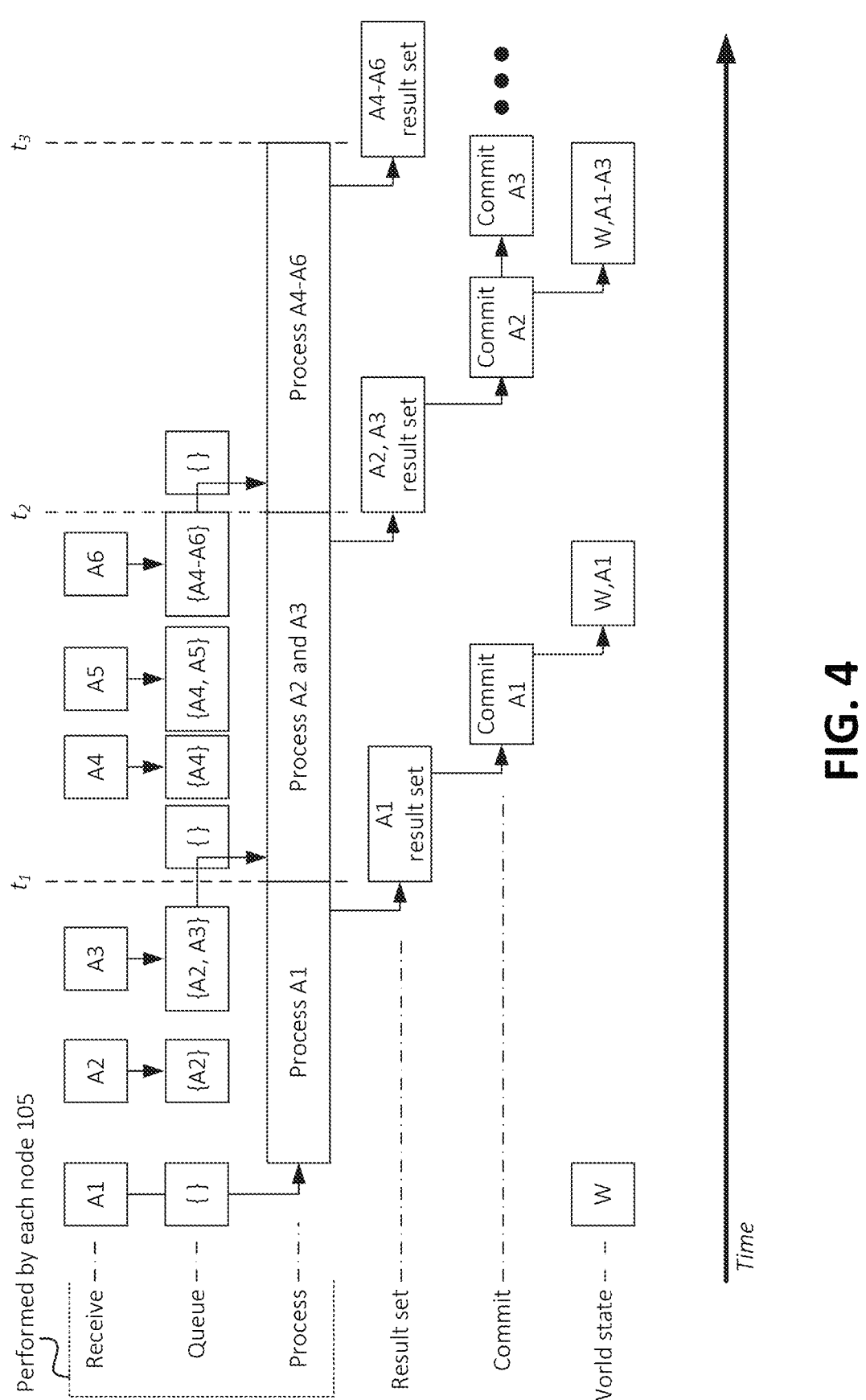
FIG. 4 illustrates an example of batch processing multiple requests to perform blockchain operations, in accordance with some embodiments.

FIG. 4 illustrates a specific example of batch processing multiple proposed blockchain operations 107, in accordance with some embodiments. As shown, multiple proposed blockchain operations 107 (denoted as A1, A2, A3, and so on) may be received by some or all nodes 105 of blockchain network 103 (e.g., via a gossip protocol or some other suitable distribution mechanism). For the sake of example, the operations performed by multiple nodes 105 are described here in the context of being performed by a single node 105, with the understanding that one or more other nodes 105 of blockchain network 103 may also perform some or all of the same operations.

As shown, node 105 may further maintain a queue, which may be used to determine which proposed blockchain operations 107 should be batch processed. In this example, when receiving A1 (e.g., at the time A1 is received), node 105 may determine that the queue is empty (as denoted by "{ }" in the figure). Since the queue is empty, node 105 may proceed with processing A1, which may include determining a result set that is based on operations, inputs, etc. specified by A1.

In this example, while node 105 is processing A1, node 105 may further receive two further proposed blockchain operations 107 (i.e., A2 and A3, in this example). At the time A2 is received, node 105 may determine that A1 is currently processing (e.g., that a result set has not been generated for A1 and/or A1 has otherwise not yet been processed). Based on determining that processing of a given proposed blockchain operation 107 (i.e., A1, in this example) has not yet been completed, node 105 may add A2 to the queue. At this point, the queue contains A2, and node 105 is currently processing (or otherwise has not yet completed processing) A1. Additionally, at this point, the world state that is based on blockchain 101 that is maintained by node 105 may be in an "initial" state "W," where the "initial" state refers to a state of values in blockchain 101 prior to committing any of the example proposed blockchain operations 107 discussed with respect to FIG. 4.

Additionally, while processing of A1 has not yet been completed, node 105 may receive another proposed blockchain operation 107 (i.e., A3, in this example). Based on determining that processing of a given proposed blockchain operation 107 (i.e., A1, in this example) has not yet been completed, node 105 may add A3 to the queue. At this point, the queue contains A2 and A3, and node 105 is currently processing (or otherwise has not yet completed processing) A1.

Once node 105 has completed processing A1 (i.e., at time t1, in this example), node 105 may identify that the queue includes A2 and A3, and may proceed with processing A2 and A3. In some embodiments, A2 and A3 may each include a timestamp, a sequence number, and/or other information based on which node 105 is able to ascertain an order in which to perform A2 and A3. As a simplistic example, assume that A2 includes an addition operation for a particular variable, and that A3 includes a multiplication operation for the particular variable. The order of these operations may be preserved by way of the timestamp, sequence number, or other suitable mechanism, such that different nodes 105 do not non-deterministically perform these operations in different sequences (e.g., that all nodes 105 perform A2 and A3 in the same sequence).

Additionally, once A1 has been processed, nodes 105 may participate in a consensus mechanism for A1, in which nodes 105 of blockchain network 103 compare their respective result sets, generated based on A1. In this example, assume that the consensus mechanism is successful, and a block based on A1 is committed to blockchain 101. World state information 301, associated with blockchain 101, may accordingly be updated based on this block (e.g., based on performing A1). In FIG. 4, world state information 301, as updated based on A1, is denoted as "W,A1".

While node 105 is processing A2 and A3 (e.g., prior to generating a result set based on performing A2 and A3), node 105 may further receive additional proposed blockchain operations 107 (i.e., A4, A5, and A6). When receiving A4, node 105 may update the queue to include A4. As similarly noted above, A4 may be added to the queue because node 105 is currently processing a previous batch (e.g., where the "previous batch" refers to A2 and A3), and/or that the previous batch has otherwise not yet completed processing. Similarly, when A5 is received, node 105 may further update the queue to include A4 and A5 and when A6 is received, node 105 may further update the queue to include A4, A5, and A6.

Once node 105 has processed A2 and A3 (i.e., has generated a result set based on processing A2 and A3 at time t2, in this example), node 105 may proceed with processing A4, A5, and A6. As similarly noted above, node 105 may sequentially perform A4, A5, and A6, in order to maintain consistency with the same processing by other nodes 105. Additionally, as noted above, once A2 and A3 have been processed, nodes 105 of blockchain network 103 may participate in a consensus mechanism to approve or validate the result set that is generated based on performing A2 and A3. In accordance with some embodiments, in order to preserve continuity and provenance, nodes 105 may separately commit respective blocks for A2 and A3 (e.g., one block may be generated based on A2 and another block may be generated based on A3). In some embodiments, these separate blocks may include metadata for their respective proposed blockchain operations 107, and may include or may be based on the same result set (e.g., the result set associated with performing A2 and A3). For example, a block for A2 may include an identifier, metadata, etc. of A2 as well as the result set based on performing A2 and A3.

Once the block associated with A2 has been committed, world state information 301 may be updated with the results of performing A1, A2, and A3. For example, since the committing of the block associated with A2 is based on the result set generated based on A2 and A3, such block may include the ultimate result of performing not only A2 but also A3. At this point, world state information 301 includes the initial world state W, as modified by A1, A2, and A3 (shown in the figure as "W,A1-A3"). As noted above, as of the committing of the block based on A2 to blockchain 101, world state information 301 includes the result of performing both A2 and A3, thus resulting in less delay than if world state information 301 were updated after the block based on A3 was committed to blockchain 101.

Additionally, upon the completion of processing A4, A5, and A6 (i.e., at time 13, in this example) similar operations described above may be repeated. For example, world state information 301 may be updated to include the result of performing A4, A5, and A6 once a block based on A4 is committed to blockchain 101 (e.g., without needing to wait for blocks based on A5 and A6 to be committed to blockchain 101).

Figure 5:
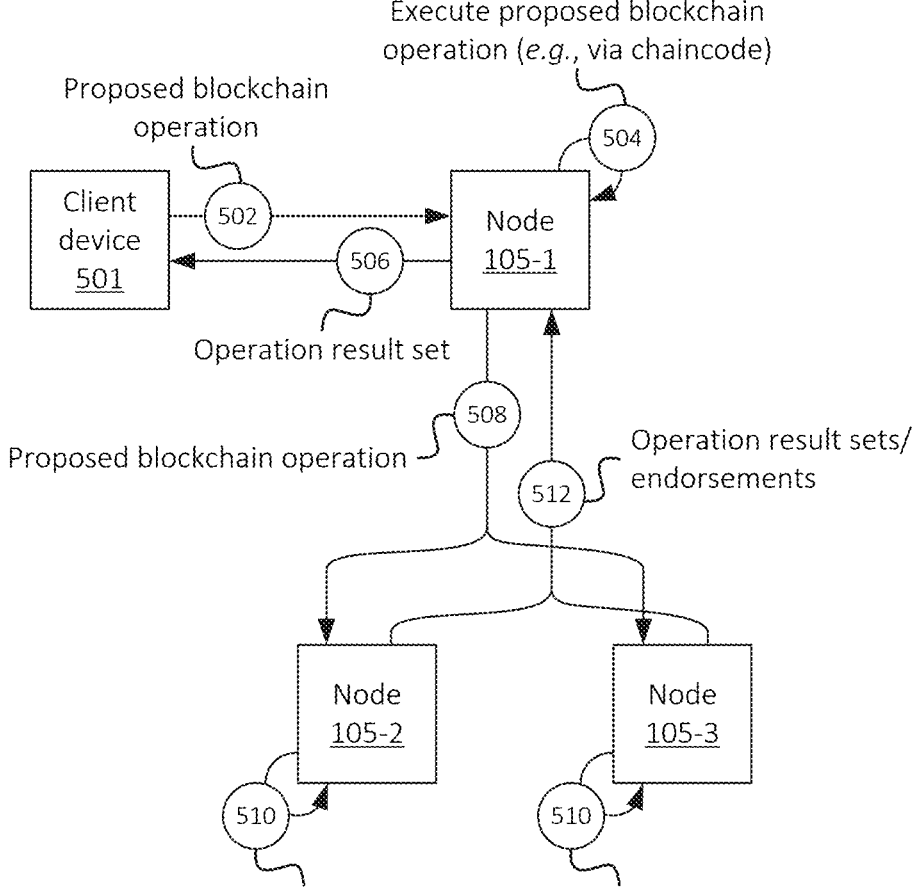

FIGS. 5 and 6 illustrate an example of modifying blockchain 101 and/or world state information based on an interaction with blockchain 101. Some of the operations described with respect to FIGS. 5 and 6 may be applicable in situations where multiple requests to perform blockchain operations are received, potentially in rapid succession, as discussed above.

As shown in FIG. 5, a particular node 105-1 may receive (at 502) a proposed blockchain operation (e.g., a request to access or record information to blockchain 101) from a particular source, such as client device 501 (e.g., which may be or may be implemented by a device or system that has access to node 105-1, such as a device or system that has authentication credentials, locator information, etc. via which client device 501 is able to interact with node 105-1). In some embodiments, node 105-1 may receive the proposed blockchain operation from a blockchain management system (e.g., which may receive the proposed blockchain operation from client device 501 and may select node 105-1 out of a group of nodes 105, such as a group of nodes associated with the same channel in a channel-based blockchain system, such as the Hyperledger® Fabric), an ordering node, or other suitable device or system.

Client device 501 may be, for example, an entity associated with blockchain 101 (e.g., may be associated with an address, a "wallet," a decentralized application ("dApp"), etc.). In this example, assume that client device 501 is authorized to initiate, request, etc. the proposed blockchain operation, which may include the modification of one or more values of one or more attributes that are currently associated with blockchain 101, the addition of one or more attributes to blockchain 101, or other suitable interactions. In other examples, node 105-1 and/or some other device or system may verify that client device 501 is authorized to initiate the proposed blockchain operation.

In some embodiments, the proposed blockchain operation (received at 502) may indicate or refer to chaincode recorded to blockchain 101, which may specify one or more inputs (e.g., types of inputs, quantity of inputs, and/or other input parameters), and may also include actions to take with respect to the inputs in order to generate one or more outputs (e.g., chaincode). For example, the proposed blockchain operation may specify particular chaincode (e.g., an address or reference associated with blockchain 101 that includes a record with which the chaincode is associated, a name or identifier of the particular chaincode, or the like) and one or more input values according to input parameters specified by the particular chaincode. In some examples, the proposed blockchain operation may refer to one or more values that have previously been recorded to blockchain 101 (and thus reflected in world state information associated with blockchain 101), such as an interaction that increments or decrements previously recorded values or performs other computations based on previously recorded values.

Node 105-1 may execute (at 504) the proposed blockchain operation, which may include accessing the one or more values that were previously recorded to blockchain 101. In order to determine the one or more values referred to in the proposed blockchain operation, node 105-1 may access world state information, maintained by node 105-1, to determine such values. Such access may include checking a local cache and/or accessing, via a network, a remote system (e.g., a "cloud" system, a containerized system, etc.) associated with node 105-1 that maintains the world state associated with blockchain 101. The execution (at 504) may be a "simulation" of the proposed blockchain operation, inasmuch as the execution and of the proposed blockchain operation and the ensuing result may not yet be recorded to blockchain 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

In some embodiments, node 105-1 may receive (at 502) multiple requests to perform blockchain operations (e.g., multiple blockchain operations). As noted above, node 105-1 may perform batch processing techniques to execute multiple sets of blockchain operations (e.g., associated with multiple different requests), where the generated result set includes the result of executing (at 504) the multiple blockchain operations indicated in multiple requests.

Node 105-1 may provide (at 506) the result set (e.g., the read-write set) based on executing (at 504) the proposed interaction to client device 501. Client device 501 may maintain the result set to, for example, verify and/or to provide approval of the result set before the result set is committed to blockchain 101. Node 105-1 may also provide (at 508) the proposed blockchain operation to one or more other nodes 105 associated with blockchain 101, such as nodes 105-2 and 105-3. In some embodiments, node 105-1 may provide (at 508) the result set generated by node 105-1 to nodes 105-2 and 105-3. Nodes 105-1 through 105-3 may all be associated with the same channel, nodes 105-2 and 105-3 may be specified by the chaincode as validators, and/or nodes 105-2 and 105-3 may otherwise be identified by node 105-1 or an associated blockchain management system as nodes that should validate, endorse, etc. the execution and result of the proposed interaction.

As similarly discussed with respect to node 105-1, nodes 105-2 and 105-3 may execute (at 510), and/or simulate the execution of, the proposed interaction. Accordingly, nodes 105-2 and 105-3 may access one or more values that were previously recorded to blockchain 101 using world state information maintained by nodes 105-2 and 105-3. Nodes 105-2 and 105-3 may validate, verify, etc. the result set generated by node 105-1 by comparing the result set with respective result sets generated by nodes 105-2 and 105-3. Nodes 105-2 and 105-3 may respond (at 512) to node 105-1 with respective result sets generated by nodes 105-2 and 105-3, and/or may respond with an indication, endorsement, etc. (e.g., which may be respectively signed by nodes 105-2 and 105-3) that the result set generated by node 105-1 is valid. Once node 105-1 has received endorsements from at least a threshold quantity of other nodes (e.g., from nodes 105-2 and 105-3, in this example), node 105-1 may determine that a consensus has been reached with respect to the result set for the proposed interaction.

As shown in FIG. 6, node 105-1 may accordingly provide (at 614), to client device 501, an indication that consensus for the result set (provided at 506) has been reached. In some embodiments, client device 501 may validate the consensus (e.g., by evaluating signatures of nodes 105-2 and 105-3) and/or may verify the result set (e.g., by itself executing the proposed interaction). Client device 501 may provide (at 616), to node 105-1, an indication that client device 501 has validated the consensus and/or has verified the result set. In some embodiments, the consensus validation indication may be signed by client device 501, thus securely authenticating the validation by client device 501.

Node 105-1 may provide (at 618) the result set, along with the consensus validation indication and the proposed blockchain operation, to ordering node 603. Ordering node 603 may be a node, associated with the same channel as nodes 105-1 through 105-3, that validates (at 620) the consensus validation indication (e.g., validates signatures associated with client device 501 and/or nodes 105-1 through 105-3) and generates a block, to be recorded to blockchain 101, that includes information regarding the blockchain operation. Such information may include an identifier of client device 501 (e.g., an address, wallet identifier, etc.), identifiers of nodes 105-1 through 105-3 that participated in generating and/or validating the result set based on the blockchain operation, chaincode inputs provided by client device 501, the consensus validation indication, one or more timestamps of the above operations and/or other events, and/or other suitable information associated with the blockchain operation. In some embodiments, the block may be signed by ordering node 603, thus securely authenticating the block creation by ordering node 603. At this point, the blockchain operation may no longer be a "proposed" blockchain operation, as the interaction has been finalized, committed, etc. by ordering node 603. In some implementations, nodes 105-1 through 105-3 may be referred to as "peers," to indicate that such nodes 105-1 through 105-3 are distinct from ordering node 603 (e.g., ordering node 603 performs one or more different operations from the peers).

Ordering node 603 may propagate (at 622) the signed block, including information regarding the finalized blockchain operation initiated by client device 501, to nodes 105-1 through 105-3 and/or other nodes associated with the same channel. Nodes 105-1 through 105-3 may validate (at 624) the block, which may include verifying the signature of ordering node 603, and may accordingly update a respective copy of blockchain 101 as maintained by each one of nodes 105-1 through 105-3. Nodes 105-1 through 105-3 may maintain respective independent copies of blockchain 101, thus providing an element of decentralization to blockchain 101. As such, when adding the block (received at 622), nodes 105-1 through 105-3 may continue to maintain separate copies of the same blockchain 101, including the information regarding the finalized blockchain operation.

Nodes 105-1 through 105-3 may also maintain respective world state information 301 (e.g., world state information 301-1, 301-2, and 301-3). For example, world state information 301 may include a portion of the information stored in blockchain 101, such as the latest version of some or all of the attributes for which information has been recorded to blockchain 101. Nodes 105-1 through 105-3 may accordingly update (at 626) respective copies of world state information 301 based on the received block. For example, in the event that the block includes a change in the value of a particular attribute, nodes 105-1 through 105-3 may update world state information 301-1 through 301-3, respectively, to replace a previous value of the attribute (e.g., a previous version of the attribute) with the newly received value of the particular attribute.

FIG. 7 illustrates an example process 700 for batch processing requests to perform blockchain operations. In some embodiments, some or all of process 700 may be performed by one or more nodes 105 of a given blockchain network 103 that maintains a particular blockchain 101 (e.g., where such nodes 105 operate in conjunction with each other, such as by implementing one or more consensus mechanisms as discussed above).

As shown, process 700 may include receiving (at 702) a first request to perform a first set of blockchain operations. For example, node 105 may receive a request to execute chaincode, record information to blockchain 101, and/or otherwise perform one or more blockchain operations. As discussed above, node 105 may proceed to begin processing the first request, which may include performing the operations specified in the first request. Additionally, or alternatively, node 105 may process the first request at a later time, such as in situations where node 105 is already processing other requests or performing other operations.

Process 700 may further include receiving (at 704), prior to generating a result set based on the first request, one or more additional requests to perform blockchain operations. For example, while node 105 is processing the first request (e.g., performing the operations specified in the first request), and/or otherwise prior to a time at which node 105 has completed processing the first request (e.g., prior to completion of the operations specified in the first request), node 105 may receive one or more additional requests, such as a second request to perform a second set of blockchain operations, a third request to perform a third set of blockchain operations, and so on.

As noted above, node 105 may forgo initiating separate processing of the second and third sets of blockchain operations based on determining, for example, that a previous set of blockchain operations (i.e., the first set of operations associated with the first request, in this example) has not yet been performed (e.g., that a result set has not yet been generated based on the first set of operations). For example, node 105 may place the additional requests (e.g., the second request, the third request, etc.) in a queue, as discussed above.

Process 700 may additionally include generating (at 706) a first result set based on the first request. For example, at some point in time after the additional requests have been received, node 105 may complete processing of the first request, which may include the generation of the first result set.

Process 700 may also include identifying (at 708) the additional requests received prior to generating the first result set. For example, based on completing the processing of the first request (e.g., based on generating the first result set), node 105 may identify the additional requests that were placed in the queue while the first request was being processed.

Process 700 may further include batch processing (at 710) the additional requests to generate a second result set. For example, as discussed above, node 105 may generate a single result set based on the multiple requests that were received prior to completion of processing of the first request. The single result set may include a result of performing the multiple additional requests, which may include a perform of the multiple additional requests in accordance with a sequence or order in which the additional requests were received (and/or in some other suitable manner that preserves a sequence associated with the multiple requests, where other nodes 105 of blockchain network 103 perform the additional requests in the same sequence).

As discussed above, some or all of the above operations may be repeated (e.g., by each node 105 of blockchain network 103), such as in situations where further requests are received prior to generation (at 710) of the second result set. For example, as discussed above, the further requests may be batch processed in a similar manner (e.g., to produce a third result set based on processing multiple further requests), which may include batch processing the further requests after the second result set is generated.

Process 700 may additionally include committing (at 712) a first block to blockchain 101 based on the first request and the first result set. For example, node 105 and some or all of the other nodes 105 of blockchain network may participate in a consensus mechanism to record, commit, etc. the first block to blockchain 101, where the first block includes or is otherwise based on the first request and the first result set. As discussed above, world state information 301, which is based on blockchain 101, may be updated based on the first result set.

Process 700 may also include committing (at 714) a second block to blockchain 101 based on the second request and the second result set. For example, node 105 and some or all of the other nodes 105 of blockchain network may participate in a consensus mechanism to record, commit, etc. the second block to blockchain 101, where the second block includes or is otherwise based on the second request and the second result set. As discussed above, world state information 301, which is based on blockchain 101, may be updated based on the second result set, which may include not only the result of performing the second set of operations of the second request, but also the result of performing the third set of operations of the third request.

Process 700 may further include committing (at 716) a third block to blockchain 101 based on the third request and the second result set. For example, node 105 and some or all of the other nodes 105 of blockchain network may participate in a consensus mechanism to record, commit, etc. the third block to blockchain 101, where the third block includes or is otherwise based on the third request and the second result set. As discussed above, world state information 301 may have already been updated with the result of processing the third request based on the committing (at 714) of the second block that is based on the second request. For example, the second block may include the result of performing both the second and third sets of operations. In some implementations, committing (at 712-716) these blocks separately may serve to preserve the provenance of blockchain 101, including indicating that particular operations were performed based on discrete requests, even if some of the blocks include batch processed result sets that include results of batch processing multiple requests.

Figure 8:
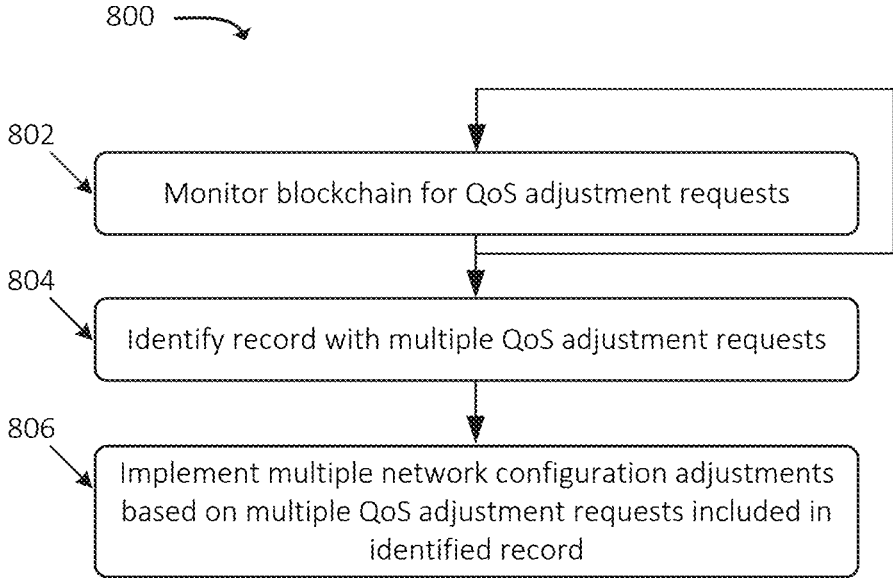
FIG. 8 illustrates an example process for modifying network configuration parameters based on QoS adjustment requests submitted via blockchain, in accordance with some embodiments.

FIG. 8 illustrates an example process 800 for modifying network configuration parameters based on QoS adjustment requests submitted via blockchain 101. In some embodiments, some or all of process 800 may be performed by network 203 (e.g., by a network management system associated with network 203 and/or some other suitable device or system associated with network 203). As noted above, network 203 may have access to blockchain 101, such as by having "read" permission in embodiments where blockchain 101 is implemented as a permissioned blockchain.

As shown, process 800 may include monitoring (at 802) blockchain 101 for QoS adjustment requests. For example, network 203 may periodically or intermittently "listen" to blockchain 101, or otherwise monitor blockchain 101, to identify new records that are recorded to blockchain 101.

At some point in time, network 203 may identify (at 804) a record with multiple QoS adjustment requests. For example, as discussed above, multiple requests may have been submitted by multiple entities, such as multiple application servers 201 that communicate via network 203, to blockchain 101 in a relatively short time. As discussed above, blockchain network 103 may have performed a batch processing operation in which the results of processing multiple blockchain operations (e.g., where each blockchain operation includes one or more separate QoS adjustment requests) are included in one record of blockchain 101. As one example, the multiple requests may include a first request for X additional amount of bandwidth for a first application server 201-1, a second request for Y additional amount of bandwidth for a second application server 201-2, and a third request for Z % lower latency for a third application server 201-3. An example record, that reflects the processing of multiple blockchain operations that each correspond to one of the requests, may include one or more values that reflect all three requests (e.g., indicates the X additional requested amount of bandwidth for application server 201-1, the Y additional amount of bandwidth for application server 201-2, and the Z % lower latency for application server 201-3).

Process 800 may further include implementing (at 806) multiple network configuration adjustments based on the multiple QoS adjustment requests included in the identified record. For example, network 203 may modify QoS parameters, priority parameters, queuing parameters, or other suitable parameters in order to satisfy the multiple requests. As discussed above, network 203 may implement the network configuration adjustments without waiting for subsequent records to be recorded to blockchain 101 (e.g., subsequent records that may be subsequently generated based on each additional proposed blockchain operation for the second and third requests, as discussed above).

Figure 9:
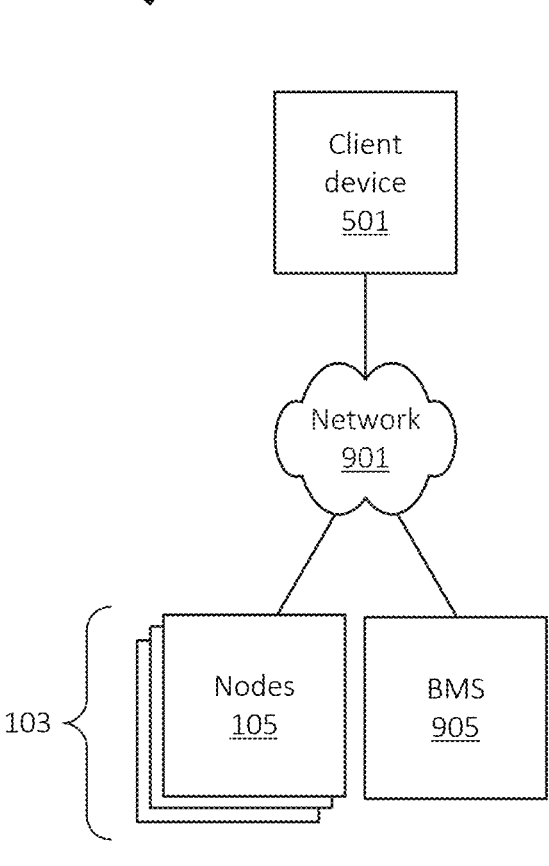
FIG. 9 illustrates an example environment in which one or more embodiments, described herein, may be implemented.

FIG. 9 illustrates an example environment 900, in which one or more embodiments may be implemented. Environment 900 may include network 203, client device 501, Blockchain Management System ("BMS") 905, application servers 201, and nodes 105. In some embodiments, environment 900 may include one or more additional devices or systems communicatively coupled to network 203 and/or one or more other networks.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900. Elements of environment 900 may interconnect with each other and/or other devices via wired connections, wireless connections, or a combination of wired and wireless connections. Some or all of the elements of environment 900 may be implemented by one or more devices, sets of hardware resources, cloud systems, or the like.

Network 203 may include one or more wired and/or wireless networks. For example, network 203 may include an IP-based Packet Data Network ("PDN"), a wide area network ("WAN") such as the Internet, a private enterprise network, and/or one or more other networks. Client device 501, BMS 905, nodes 105, and/or other devices or systems may communicate, through network 203, with each other and/or with other devices that are coupled to network 203. Network 203 may be connected to one or more other networks, such as a public switched telephone network ("PSTN"), a public land mobile network ("PLMN"), and/or another network. Network 203 may be connected to one or more devices, such as content providers, applications, web servers, and/or other devices, with which client device 501, BMS 905, nodes 105, and/or other devices or systems may communicate.

Client device 501, BMS 905, nodes 105, and/or other devices or systems may be implemented by one or more cloud systems, server devices, or other types of hardware resources. In some embodiments, client device 501, BMS 905, and/or nodes 105 may be implemented by or communicatively coupled to a User Equipment ("UE"), which may include a computation and communication device, such as a wireless mobile communication device that is capable of communicating with network 203. The UE may communicate with network 203 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 10:
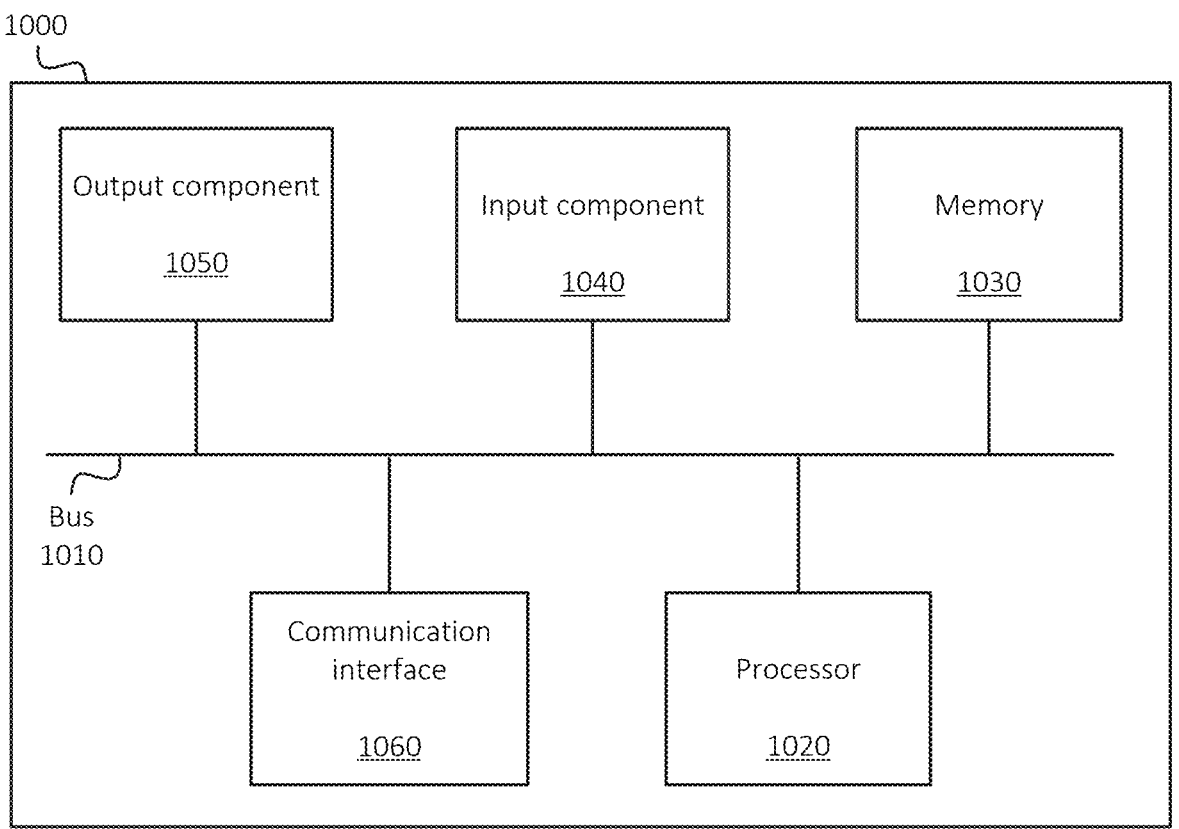
FIG. 10 illustrates example components of device.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via a RAN, a wired network, the Internet, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain a blockchain in conjunction with a plurality of other devices;

receive a first request to perform a first set of operations with respect to the blockchain;

determine that a request processing queue is empty;

process the first request based on receiving the first request and further based on determining that the request processing queue is empty, wherein processing the first request includes performing the first set of operations to generate a first result set;

prior to completing processing of the first request, receive:

a second request to perform a second set of operations with respect to the blockchain, and a third request to perform a third set of operations with respect to the blockchain;

identify that the second and third requests were received prior to completing the processing of the first request;

add the second request and the third request to the requesting processing queue based on identifying that the second and third requests were received prior to completing the processing of the first request;

after completing processing of the first request, identify that the request processing queue includes the second and third requests;

based on completing processing of the first request and further based on identifying that the request processing queue includes the second and third requests, batch process the second and third requests, wherein batch processing the second and third requests includes performing the second set of operations and the third set of operations to generate a second result set, wherein the second result set is based on performing the second and third sets of operations with respect to the blockchain; and implement a consensus mechanism with the plurality of other devices with respect to the blockchain, wherein implementing the consensus mechanism includes:

committing, in conjunction with the plurality of other devices, a first block to the blockchain based on the first result set that was generated based on processing the first request, and committing, in conjunction with the plurality of other devices, a second block to the blockchain based on the second result set that was generated based on processing the second and third requests.

2. The device of claim 1, wherein the one or more processors are further configured to:

maintain world state information associated with the blockchain;

identify the second result set associated with the second first block; and update, prior to the second block being committed to the blockchain, the world state information based on the second result set that is based on performing the second and third sets of operations with respect to the blockchain.

3. The device of claim 1, wherein a particular device, of the plurality of other devices, generates a third result set based on performing the second and third sets of operations with respect to the blockchain, wherein the third result set is a same result set as the second result set.

4. A non-transitory computer-readable medium, storing a plurality of processor-executable instructions to:

maintain a blockchain in conjunction with a plurality of other devices;

receive a first request to perform a first set of operations with respect to the blockchain;

determine that a request processing queue is empty;

process the first request based on receiving the first request and further based on determining that the request processing queue is empty, wherein processing the first request includes performing the first set of operations to generate a first result set;

prior to completing processing of the first request, receive:

a second request to perform a second set of operations with respect to the blockchain, and a third request to perform a third set of operations with respect to the blockchain;

identify that the second and third requests were received prior to completing the processing of the first request;

add the second request and the third request to the requesting processing queue based on identifying that the second and third requests were received prior to completing the processing of the first request;

after completing processing of the first request, identify that the request processing queue includes the second and third requests;

based on completing processing of the first request and further based on identifying that the request processing queue includes the second and third requests, batch process the second and third requests, wherein batch processing the second and third requests includes performing the second set of operations and the third set of operations to generate a second result set, wherein the second result set is based on performing the second and third sets of operations with respect to the blockchain; and implement a consensus mechanism with the plurality of other devices with respect to the blockchain, wherein implementing the consensus mechanism includes:

committing, in conjunction with the plurality of other devices, a first block to the blockchain based on the first result set that was generated based on processing the first request, and committing, in conjunction with the plurality of other devices, a second block to the blockchain based on the second result set that was generated based on processing the second and third requests.

5. The non-transitory computer-readable medium of claim 4, wherein the plurality of processor-executable instructions further include processor-executable instructions to:

maintain world state information associated with the blockchain;

identify the second result set associated with the second block; and update, prior to the second block being committed to the blockchain, the world state information based on the second result set that is based on performing the second and third sets of operations with respect to the blockchain.

6. The non-transitory computer-readable medium of claim 4, wherein a particular device, of the plurality of other devices, generates a third result set based on performing the second and third sets of operations with respect to the blockchain, wherein the third result set is a same result set as the second result set.

7. A method, comprising:

maintaining, by a device, a blockchain in conjunction with a plurality of other devices;

receiving a first request to perform a first set of operations with respect to the blockchain;

determining that a request processing queue is empty:

processing the first request based on receiving the first request and further based on determining that the request processing queue is empty, wherein processing the first request includes performing the first set of operations to generate a first result set;

prior to completing processing of the first request, receiving:

a second request to perform a second set of operations with respect to the blockchain, and a third request to perform a third set of operations with respect to the blockchain;

identifying that the second and third requests were received prior to completing the processing of the first request;

adding the second request and the third request to the requesting processing queue based on identifying that the second and third requests were received prior to completing the processing of the first request;

after completing processing of the first request, identifying that the request processing queue includes the second and third requests;

based on completing processing of the first request and further based on identifying that the request processing queue includes the second and third requests, batch processing the second and third requests, wherein batch processing the second and third requests includes performing the second set of operations and the third set of operations to generate a second result set, wherein the second result set is based on performing the second and third sets of operations with respect to the blockchain; and implementing a consensus mechanism with the plurality of other devices with respect to the blockchain, wherein implementing the consensus mechanism includes:

committing, in conjunction with the plurality of other devices, a first block to the blockchain based on the first result set that was generated based on processing the first request, and committing, in conjunction with the plurality of other devices, a second block to the blockchain based on the second result set that was generated based on processing the second and third requests.

8. The method of claim 7, further comprising:

maintaining world state information associated with the blockchain;

identifying the second result set associated with the second block; and updating, prior to the second block being committed to the blockchain, the world state information based on the second result set that is based on performing the second and third sets of operations with respect to the blockchain.

9. The method of claim 7, wherein a particular device, of the plurality of other devices, generates a third result set based on performing the second and third sets of operations with respect to the blockchain, wherein the third result set is a same result set as the second result set.

10. The method of claim 9, wherein implementing the consensus mechanism includes determining, based on the third result set being the same result set as the second result set, that consensus has been reached with respect to the first result set, wherein committing the first block to the blockchain is further based on determining that consensus has been reached with respect to the first result set.

11. The method of claim 9, wherein the particular device generates the third result set based on receiving a plurality of requests that include a request to perform the second set of operations with respect to the blockchain a request to perform a third set of operations with respect to the blockchain before the particular device has completed processing another set of operations.

12. The method of claim 8, further comprising:

receiving a request for blockchain information prior to the second block being committed to the blockchain; and providing, in response to the request for blockchain information, the updated world state information that is based on the second result set.

13. The device of claim 3, wherein implementing the consensus mechanism includes determining, based on the third result set being the same result set as the second result set, that consensus has been reached with respect to the first result set, wherein committing the first block to the blockchain is further based on determining that consensus has been reached with respect to the first result set.

14. The device of claim 3, wherein the particular device generates the third result set based on receiving a plurality of requests that include a request to perform the second set of operations with respect to the blockchain a request to perform a third set of operations with respect to the blockchain before the particular device has completed processing another set of operations.

15. The device of claim 2, wherein the one or more processors are further configured to:

receive a request for blockchain information prior to the second block being committed to the blockchain; and provide, in response to the request for blockchain information, the updated world state information that is based on the second result set.

16. The non-transitory computer-readable medium of claim 6, wherein implementing the consensus mechanism includes determining, based on the third result set being the same result set as the second result set, that consensus has been reached with respect to the first result set, wherein committing the first block to the blockchain is further based on determining that consensus has been reached with respect to the first result set.

17. The non-transitory computer-readable medium of claim 6, wherein the particular device generates the third result set based on receiving a plurality of requests that include a request to perform the second set of operations with respect to the blockchain a request to perform a third set of operations with respect to the blockchain before the particular device has completed processing another set of operations.

18. The non-transitory computer-readable medium of claim 5, wherein the plurality of processor-executable instructions further include processor-executable instructions to:

receive a request for blockchain information prior to the second block being committed to the blockchain; and provide, in response to the request for blockchain information, the updated world state information that is based on the second result set.

* * * * *